United States Patent
Ramasamy et al.

(10) Patent No.: US 8,850,063 B2
(45) Date of Patent: Sep. 30, 2014

(54) WIDE-AREA APPLICATION SERVICES DEVICE TO DETERMINE PACKET LOOP ERRORS IN A DATA CENTER THAT COMMUNICATES OVER A WIDE AREA NETWORK

(75) Inventors: Arivu Ramasamy, San Jose, CA (US); Martin Cieslak, Northville, MI (US); Zachary Seils, Austin, TX (US); Natarajan Chidambaram, San Jose, CA (US); Abdolreza Saadat, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 569 days.

(21) Appl. No.: 13/191,575

(22) Filed: Jul. 27, 2011

(65) Prior Publication Data

US 2013/0031269 A1    Jan. 31, 2013

(51) Int. Cl.
*G06F 13/00* (2006.01)
*H04L 12/705* (2013.01)

(52) U.S. Cl.
CPC ..................................... *H04L 45/18* (2013.01)
USPC .......................................................... 709/238

(58) Field of Classification Search
CPC ... H04L 45/18; H04L 29/06; H04L 29/08072; H04L 29/08144; H04L 29/12009
USPC .......................................................... 709/238
See application file for complete search history.

(56) References Cited

U.S. PATENT DOCUMENTS

| | | |
|---|---|---|
| 2004/0174816 A1 | 9/2004 | Stewart et al. |
| 2008/0205445 A1 | 8/2008 | Kumar et al. |
| 2009/0052466 A1 | 2/2009 | Khalid et al. |
| 2009/0067440 A1* | 3/2009 | Chadda et al. ................ 370/401 |
| 2010/0146074 A1 | 6/2010 | Srinivasan |

* cited by examiner

*Primary Examiner* — Robert B Harrell
(74) *Attorney, Agent, or Firm* — Edell, Shapiro & Finnan, LLC

(57) ABSTRACT

Techniques are provided to detect and correct for packet loops associated with network traffic that passes through a wide-area application services (WAAS) device in a data center network environment. The WAAS device receives a packet from a device in a first data center. The WAAS device determines the directionality of the packet relative to a destination device of the packet. The WAAS device also determines whether the packet has an indicator that associates the packet with the WAAS device. Based on whether the packet has an indicator that associates the packet with the wide area application services device, the WAAS device inserts an indicator within the packet when the directionality of the packet indicates that the packet is to be transmitted across a wide area network (WAN), wherein the indicator comprises information that associates the packet with the WAAS device. The WAAS device forwards the packet to a network based on its directionality.

14 Claims, 6 Drawing Sheets

WIDE-AREA APPLICATION SERVICES DEVICE TO DETERMINE PACKET LOOP ERRORS IN A DATA CENTER THAT COMMUNICATES OVER A WIDE AREA NETWORK

TECHNICAL FIELD

The present disclosure relates to handling packets in a data center network environment.

BACKGROUND

Transparent network service devices, such as a wide-area application services device, are used in network deployments to optimize network traffic flow and accelerate applications over a wide area network (WAN). These network services devices may attract network traffic in several ways. For example, these devices may reside physically within the path of traffic flow and may receive network traffic. Service devices may also receive network traffic when the traffic is directed in accordance with a traffic redirection scheme such as a Web Cache Communication Protocol (WCCP).

When the service devices receive network traffic, packets of the network traffic can sometimes traverse the same network link more than once, depending on how the traffic routing is configured in the network. In one example, when packets traverse the same network link more than once, network elements in the path (e.g., a network service device) may detect a packet loop. This is because the packets that are sent by the network service device may go to a first router device of a network, and may be sent back to the network service device. The network service device might confuse these packets with packets that it directly receives from client devices of the network.

DESCRIPTION OF EXAMPLE EMBODIMENTS

Overview

Techniques are provided to detect and correct for packet loops associated with network traffic that passes through a wide-area application services (WAAS) device in a data center network environment. The WAAS device receives a packet from a device in a first data center. The WAAS device determines the directionality of the packet relative to a destination device of the packet. The WAAS device also determines whether the packet has an indicator that associates the packet with the WAAS device. Based on whether the packet has an indicator that associates the packet with the wide area application services device, the WAAS device inserts an indicator within the packet when the directionality of the packet indicates that the packet is to be transmitted across a wide area network (WAN). The indicator inserted in the packet comprises information that associates the packet with the WAAS device. The WAAS device forwards the packet to a network based on its directionality.

Example Embodiments

Figure 1:
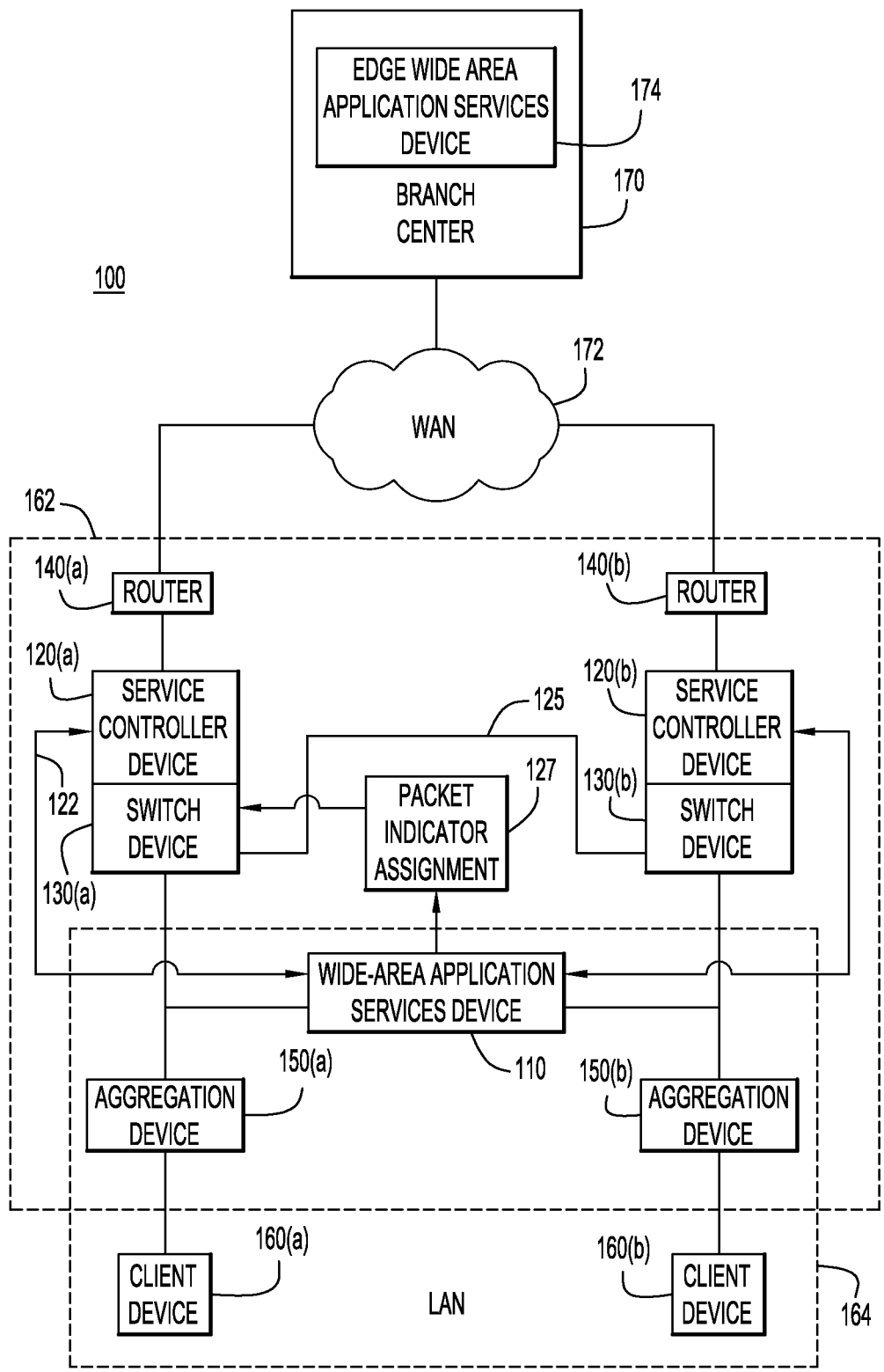
FIG. 1 is a block diagram illustrating an example network topology of a data center that is in communication with a branch center over a wide area network, where a network device at the data center is configured to detect packet loops in network traffic.

FIG. 1 shows an example of a data center network environment 100 featuring a wide-area application services (WAAS) device 110 and multiple service controller devices at 120(a) and 120(b). The WAAS device 110, which may also be referred to as a wide-area application engine device, is coupled to the service controller devices 120(a) and 120(b) via respective switch devices 130(a) and 130(b). In one example, the service controller devices 120(a) and 120(b) may be integrated within or configured as a part of their respective switch devices 130(a) and 130(b). For example, service controller device 120(a) may reside within switch device 130(a), and service controller device 120(b) may reside within switch device 130(b). For simplicity, FIG. 1 shows the service controller devices 120(a)-(b) as separate devices from the switch devices 130(a)-(b). The service controller devices 120(a) and 120(b) are coupled to respective router devices, depicted at 140(a) and 140(b). The WAAS device 110 is coupled to the service controller device 120(a) via link 122 and is coupled to the service controller device 120(b) via link 124. The switch devices 130(a) and 130(b) are coupled to each other via link 125. In one example, the WAAS device 110 may insert packet indicators shown at 127 for insertion into received packets, and may transmit these packets to the service controller device 120(a) across link 122.

The WAAS device 110 is also coupled to aggregation devices 150(a) and 150(b), which are coupled to respective client devices 160(a) and 160(b). The WAAS device 110, service controller devices 120(a)-(b), switch devices 130(a)-(b), router devices 140(a)-(b), and aggregation devices 150(a)-(b) are configured to reside in a first data center 162. The client devices 160(a) and 160(b) are configured to communicate (e.g., transmit and receive packets of network traffic) with each other across a local area network (LAN) 164, utilizing components of the data center 162 (e.g., aggregation devices 150(a)-(b) and WAAS device 110). Components of the data center 162 are configured to communicate (e.g., transmit and receive packets of network traffic) with a second data center, e.g., a branch center 170, across a wide area network (WAN) 172. The branch center 170 may have its own WAAS device, shown at 174. The WAAS device 110 in the data center 162 is referred to as a "core" WAAS device, and the WAAS device 174 located in the branch center 170 behind the WAN 172 is referred to as an "edge" WAAS device. In one example, the WAAS device 110 is configured to receive packets of network traffic originating from client devices 160(a) and 160(b) via the LAN 164 or from devices in the branch center 170 (e.g., edge WAAS device 174) via the WAN 172. The WAAS device 110 also may be configured to transmit packets to the client devices 160(a) and 160(b) or devices in the branch center 170, as described herein.

Figure 2:
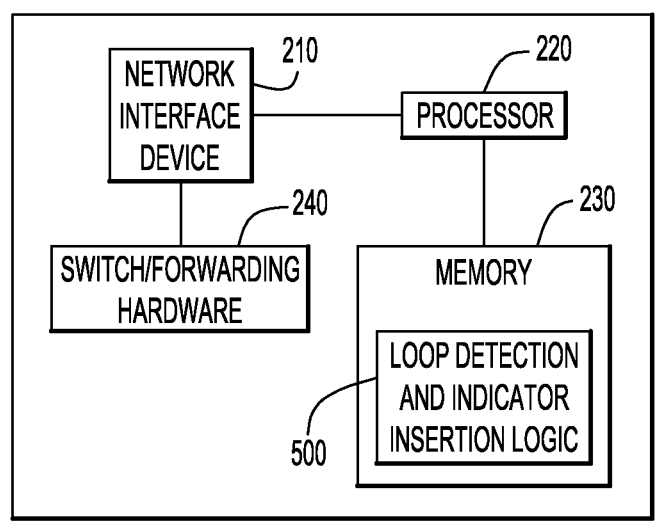
FIG. 2 is a block diagram showing an example of a wide-area application services (WAAS) device configured with packet loop detection and indicator assertion logic to associate packets of network traffic with the WAAS device and to detect packet loops.

Turning to FIG. 2, a block diagram showing an example of the WAAS device 110 is now described. The WAAS device 110 comprises a network interface device 210, a processor 220, a memory 230 and a switch/forwarding hardware unit 240. Network interface device 210 is configured to enable network communications to, for example, receive packets of network traffic from components within the data center 162 and transmit packets to components within the data center 162. Processor 220 is coupled to the network interface device 210 and to the memory 230. Processor 220 is, for example, a microprocessor or microcontroller that is configured to execute program logic instructions (i.e., software) for carrying out various operations and tasks described herein. For example, processor 220 is configured to execute packet loop detection and indicator insertion logic 500 that is stored in memory 230 to associate packets of network traffic that pass through the WAAS device 110 and to detect packet loops of network traffic within the data center 162. Memory 230 may comprise read only memory (ROM), random access memory (RAM), magnetic disk storage media devices, optical storage media devices, flash memory devices, electrical, optical or other physical/tangible memory storage devices.

The functions of processor 220 may be implemented by logic encoded in one or more tangible computer readable storage media (e.g., embedded logic such as an application specific integrated circuit, digital signal processor instructions, software that is executed by a processor, etc), wherein memory 230 stores data used for the operations described herein and stores software or processor executable instructions that are executed to carry out the operations described herein.

Packet loop detection and indicator insertion logic 500 may take any of a variety of forms, so as to be encoded in one or more tangible computer readable memory media or storage device for execution by a processor or in other forms, such as fixed logic or programmable logic (e.g., software/computer instructions executed by a processor) and the processor 220 may be an application specific integrated circuit (ASIC) that comprises fixed digital logic, or a combination thereof. For example, the processor 220 may be embodied by digital logic gates in a fixed or programmable digital logic integrated circuit, which digital logic gates are configured to perform operations of the packet loop detection and indicator insertion logic 500. In general, packet loop detection and indicator insertion logic 500 may be embodied in one or more computer readable storage media encoded with software comprising computer executable instructions and when the software is executed operable to perform the operations described herein.

The WAAS device 110 also comprises the switch/forwarding hardware 240 that is coupled to the network interface device 210 and the processor 220. The switch/forwarding hardware 240 is configured, for example, queue incoming packets and to route packets to the network interface device 210 via an appropriate output port (not shown) to be sent to appropriate destination devices.

FIG. 2 shows an example of an apparatus comprising a network interface device; a packet forwarding/routing device; a memory; and a processor that, according to the techniques described herein, is configured to: receive a packet from a device of the first data center; determine a directionality of the packet relative to a destination device of the packet; determine whether the packet has an indicator that associates the packet the apparatus; based on whether the packet has an indicator that associates the packet with the wide area application services device, have an indicator, insert an indicator in the packet when the directionality of the packet indicates that the packet is to be transmitted across a wide area network, wherein the indicator inserted in the packet comprises information that associates the packet with the apparatus; and forward the packet to a network based on its directionality.

Figure 3A:
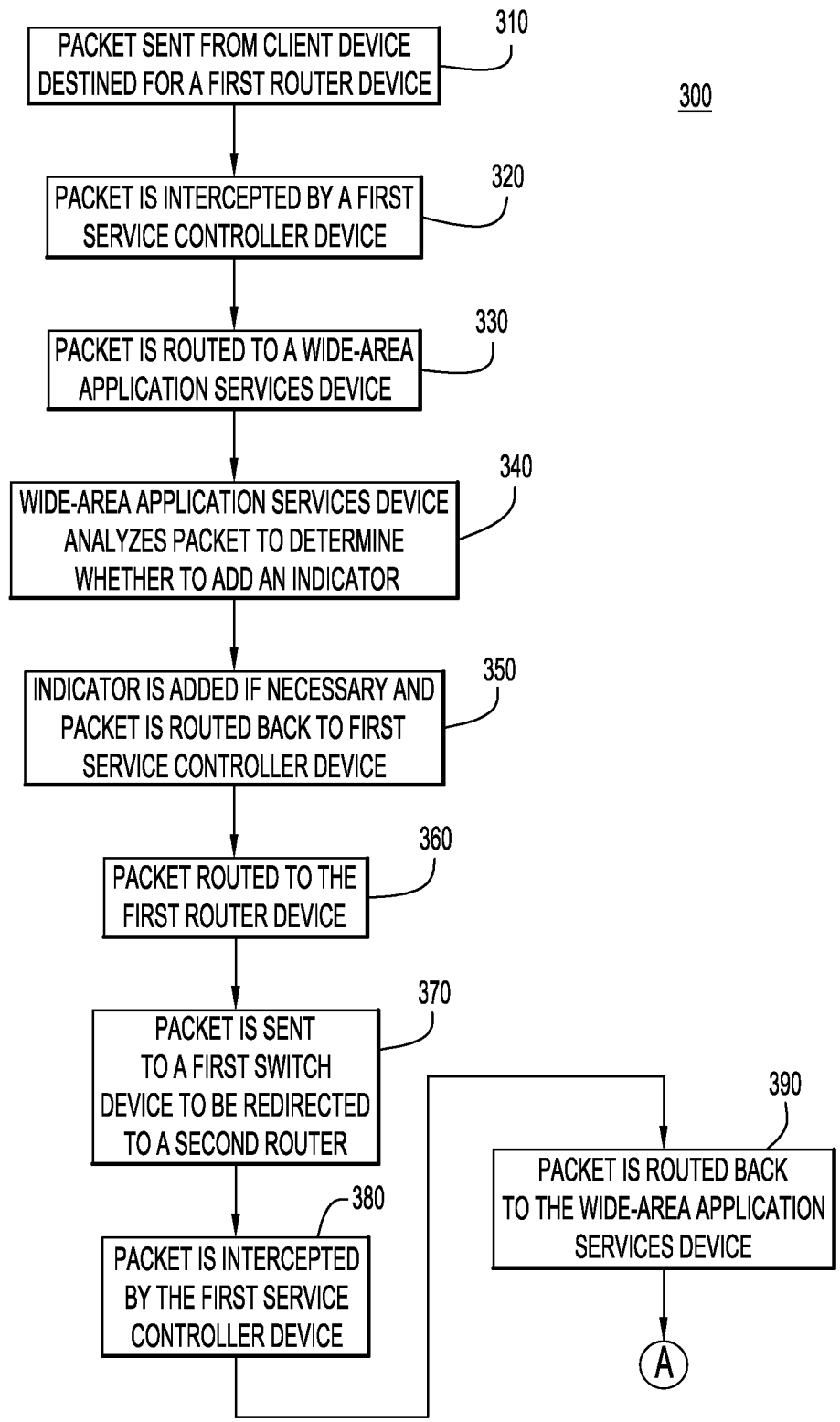
FIGS. 3A and 3B are flow charts depicting examples of the flow of the packets through the data center.
Figure 3B:
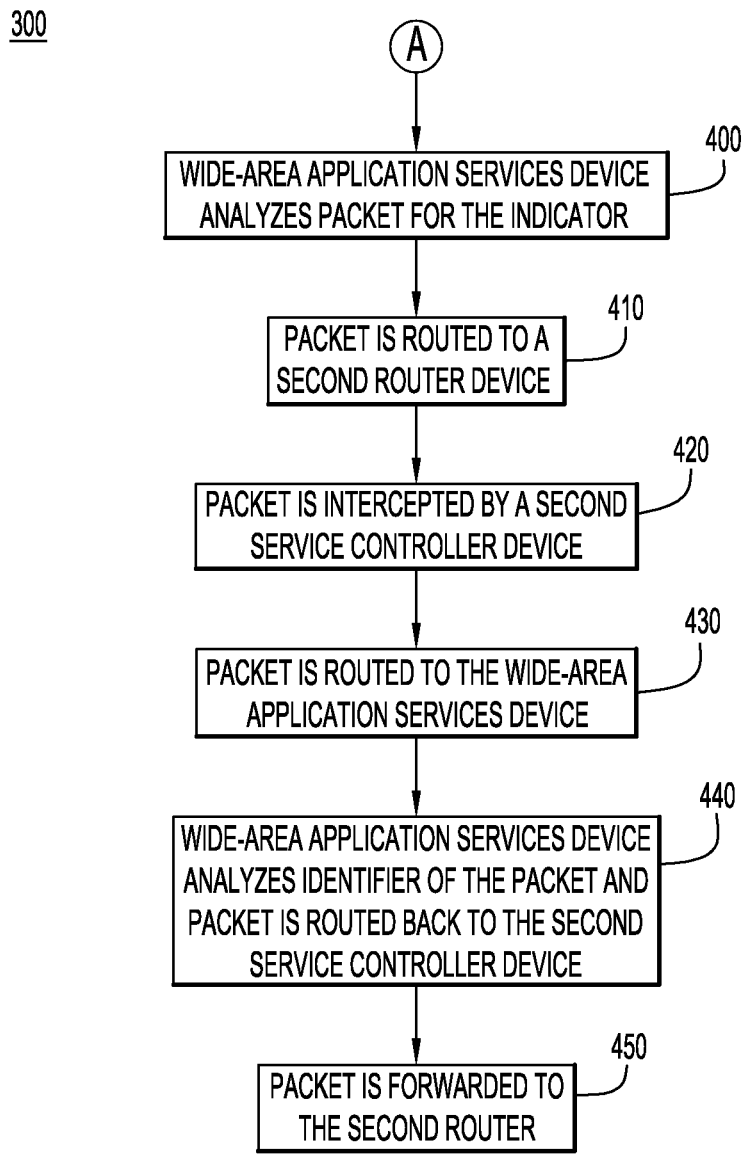

Turning to FIGS. 3A and 3B, a flow chart is now described that depicts the flow of packets through the data center and generally depicts operations of the WAAS device 110. Reference is also made to FIG. 1 in connection with the description of FIGS. 3A and 3B. At 310, a packet is sent from a client device (for simplicity, client device 160(a)) destined for a first router (e.g., router 140(a)). For example, the packet may ultimately be destined for a server in the branch center 170. Client device 160(a) may use one of the routers, for example, router 140(a), as its Internet Protocol (IP) default gateway, and thus, client device 160(a) may transmit a packet that is destined for router 140(a). Similarly, client device 160(b) may send the packet that is destined for router 140(b) (and ultimately destined for a server at the branch center 170). The routers (e.g., router 140(a) and router 140(b)) are both connected to WAN 172 from, for example, different service providers.

The packet, sent from client device 160(a) and destined for router 140(a), travels to aggregation device 150(a) within a LAN 164. The aggregation device 150(a) sends the packet to the switch device 130(a), which directs the packet to be sent to router 140(a). At 320, the packet is intercepted by a first service controller device (e.g., service controller device 120(a)). The service controller device 120(a), at 330, then redirects and routes the packet across link 122, to the WAAS device 110. The WAAS device 110, at 340, analyzes the packet to determine whether it should add an indicator to the packet. In performing this analysis, the WAAS device 110 may, for example, determine a directionality of the packet relative to a destination device of the packet and may determine whether the packet has an indicator that associates the packet with a WAAS device (e.g., the core WAAS device, shown at 110, the edge WAAS device 174, or another WAAS device).

At 350, if the WAAS device 110 determines that it should add or insert an indicator (e.g., based on whether the packet has an indicator that associates the packet with the wide area application services device), an indicator is inserted in the packet, and the packet is routed back to the service controller device 120(a). The WAAS device 110 inserts the indicator when the directionality of the packet indicates that the packet is to be transmitted across a WAN 172 and based on whether the packet has an indicator that associates the packet with the wide area application services device (e.g., when the packet does not already have an indicator assigned to it). If the directionality of the packet indicates that the destination device for the packet is in a second data center other than data center 162 (e.g., edge WAAS device 174 in branch center 170), the WAAS device 110 directs the packet to be transmitted to the second data center over the WAN 172. The indicator included within the packet by the WAAS device 110 may comprise information that associates the packet with the WAAS device 110. In one example, the indicator may be a transport control protocol (TCP) option tag that is marked and checked by the WAAS device 110. The service controller device 120(a) routes the packet, at 360, to the first router device (e.g., router 140(a)).

In some cases, it is possible that client device 160(a), which uses router 140(a) as its default gateway, may attempt to transmit packets of network traffic to reach destinations that have low network traffic transmission costs through router 140(b). In this case, router 140(a) would redirect these packets to a second router device (e.g., router 140(b)) through the switch devices 130(*a*) and 130(*b*) to be transmitted to the destination device across the WAN 172. For example, the packets from client device 160(*a*) may go to router 140(*a*) and router 140(*a*) may decide to route the packets to router 140(*b*), for network transmission efficiency. As a part of this rerouting process, router 140(*a*) would redirect the packets to switch device 130(*a*) to route the packet to router 140(*b*). Upon receiving the packet, router 140(*b*) would send the packet to the ultimate destination device (e.g., across WAN 172).

At 370, router 140(*a*) determines that the packet is to be redirected to router 140(*b*) and sends the packet to the switch device 140(*a*) to redirect the packet to router 140(*b*). The packet, at 380, is then intercepted by a second service controller device (e.g., service controller device 120(*a*)). Thus, the service controller device 120(*a*) sees the packet for a second time. At 390, the packet is routed back to the WAAS device 110 across the link 122, and the WAAS device 110 also sees the packet for the second time.

At 400, in FIG. 3B, the WAAS device 110 analyzes the packet for an indicator and forwards the packet back to the service controller device 120(*a*). In the example where the WAAS device 110 previously added the indicator (described by operation 350, above), the WAAS device 110 is able to recognize that the indicator associates the packet with the WAAS device 110. In other words, when the WAAS device 110 receives the packet from the service controller device 120(*a*) for the second time, the WAAS device 110 determines that the packet is associated with the WAAS device 110 because the WAAS device 110 recognizes the same indicator that it inserted, as described in operation 350.

At 410, the packet is routed to router 140(*b*), for example, by routing the packet from switch device 130(*a*) to switch device 130(*b*) across link 125, for ultimate transmission to router 140(*b*). At 420, the service controller device 120(*b*) intercepts the packet, and at 430, the service controller device 120(*b*) redirects and routes the packet to the WAAS device 110 across link 124. The WAAS device 110 thus receives the packet for a third time. At 440, the WAAS device 110 analyzes the packet for the indicator and the packet is routed back to the service controller device 120(*b*) across link 124. At 440, the WAAS device 110 is able to recognize the indicator it previously added that associates the packet with the WAAS device 110. At 450, the packet is forwarded to router 140(*b*) to be transmitted across WAN 172.

As described above in FIGS. 3A and 3B, the WAAS device 110 may receive the same packet multiple times during the transmission of packets between client device 160(*a*) and router 140(*b*). The WAAS device 110 also may receive a packet multiple times for other traffic flows. For example, WAAS device 110 may receive WAN traffic comprising packets across the WAN 172, originating from devices in branch center 170 that are ultimately to be transmitted to client devices 160(*a*) or 160(*b*). Likewise, the WAAS device 110 may receive WAN traffic comprising packets originating from client devices 160(*a*) or 160(*b*) that are destined for devices within the branch center 170 across the WAN 172. The WAAS device 110 may also receive LAN traffic comprising packets originating from one client device (e.g., client device 160(*a*)) and destined for another client device (e.g., client device 160(*b*)) within the same data center.

When the WAAS device 110 receives the same packet multiple times, the WAAS device 110 is able to distinguish between real packet loops, which result in packets being transmitted to the WAAS device 110 due to configuration errors or routing policy errors, and perceived packet loops, where packets are received by the WAAS device 110 multiple times as a part of an operational routing policy. When the WAAS device 110 distinguishes the real packet loops from the perceived packet loops, the WAAS device 110 can handle the packets accordingly. For example, the WAAS device 110 can treat process/handle packet loops based on existing loop prevention methods available as a part of IP standards, e.g., evaluating and discharging packets based on time to live (TTL) values. The WAAS device 110 can handle perceived packet loops by bypassing redundant interception of the packets and by forwarding the packets normally based on bridging or IP routing configurations. The WAAS device 110 can distinguish between perceived packet loops and real packet loops by analyzing, for example, the information contained within the packets (e.g., the indicator inserted into the packets and directionality information), as described herein.

When distinguishing between real packet loops and perceived packet loops, the WAAS device 110 detects the occurrence of packets that are received multiple times in different network transmissions. For example, the WAAS device 110 distinguishes between received packets of WAN traffic destined for a client device within the data center 162 (e.g., originating from a device in branch center 170) from received packets of LAN traffic destined for the same client device within the data center 162 (e.g., originating from another client device in the data center 162). In this example, the destination IP port information would be the same for the received packets, since the packets are destined for the same client device.

In another example, the WAAS device 110 distinguishes between received packets of WAN traffic originating from a client device within the data center 162 (e.g., destined for a device in branch center 170) from received packets of LAN traffic originating from the same client device (e.g., destined for another client device in the data center 162). In this example, the source and destination IP ports on both the perceived looped packets and the received packets are the same, since the packets originate from the same client device.

In one embodiment, the indicator is, for example, similar to auto-discovery options used on synchronize ("syn") packets, acknowledgment ("ack") packets, and synchronize-acknowledgment ("syn-ack") packets. For example, the WAAS device 110 may add a two byte TCP option tag as an indicator, according to the following format:

| 0 | 1 |
|---|---|
| T | L | where T represents an "add" option kind for TCP option 0x21 and where L represents the option length (e.g., two bytes).

The indicator may have content that distinguishes the perceived looped packets from the real looped packets. For example, in the situation where the WAAS device 110 distinguishes between received packets of WAN traffic destined for a client device and received packets of LAN traffic destined for the client device, the WAAS device 110 can evaluate the packet to determine its directionality and whether or not the packet has an indicator associating it with a WAAS device. If the packet does not have an indicator and the directionality of the packet indicates that it is destined for a client device in the data center 162, the WAAS device 110 determines that the packet is a "real" looped packet. In this example, if the packet has an indicator (e.g., associated with edge WAAS 174), the WAAS device 110 determines that the packet is traffic received via the WAN 172 destined for the client device in the data center 162, and thus, that the packet is not looped within the data center 162.

In the example where the WAAS device 110 distinguishes between received packets of WAN traffic originating from a client device within the data center 162 from received packets of LAN traffic originating from the same client device, the WAAS device 110 can evaluate the packet to determine its directionality and whether or not the packet has an indicator associating it with a WAAS device. If the packet has an indicator associating it with a WAAS device, and the directionality of the packet indicates that it originated from a client device in the data center 162, the WAAS device 110 determines that the packet is a real looped packet. The presence of the indicator in the packet indicates to the WAAS device 110 that the packet has already been received via the WAN 172 (e.g., from edge WAAS device 174 of branch center 170). In this example, if the packet did not have an indicator, the packet would have originated from a client device of the data center 162, and would not have already been received via the WAN 172.

Once the WAAS device 110 distinguishes the perceived looped packets from the real looped packets, the WAAS device 110 returns the real looped packets to the network without processing the packet, as described herein. This helps network connectivity and network data transmission proceed normally even in the face of perceived loop conditions where the WAAS device 110 fails. Alternatively, sequence numbers and acknowledgement numbers in the packets may be used to distinguish the perceived looped packets from the real looped packets, since the sequence numbers and acknowledgment numbers in packets transmitted over the WAN 172 are different from the sequence and acknowledgement number in packets transmitted on the LAN 164.

Figure 4:
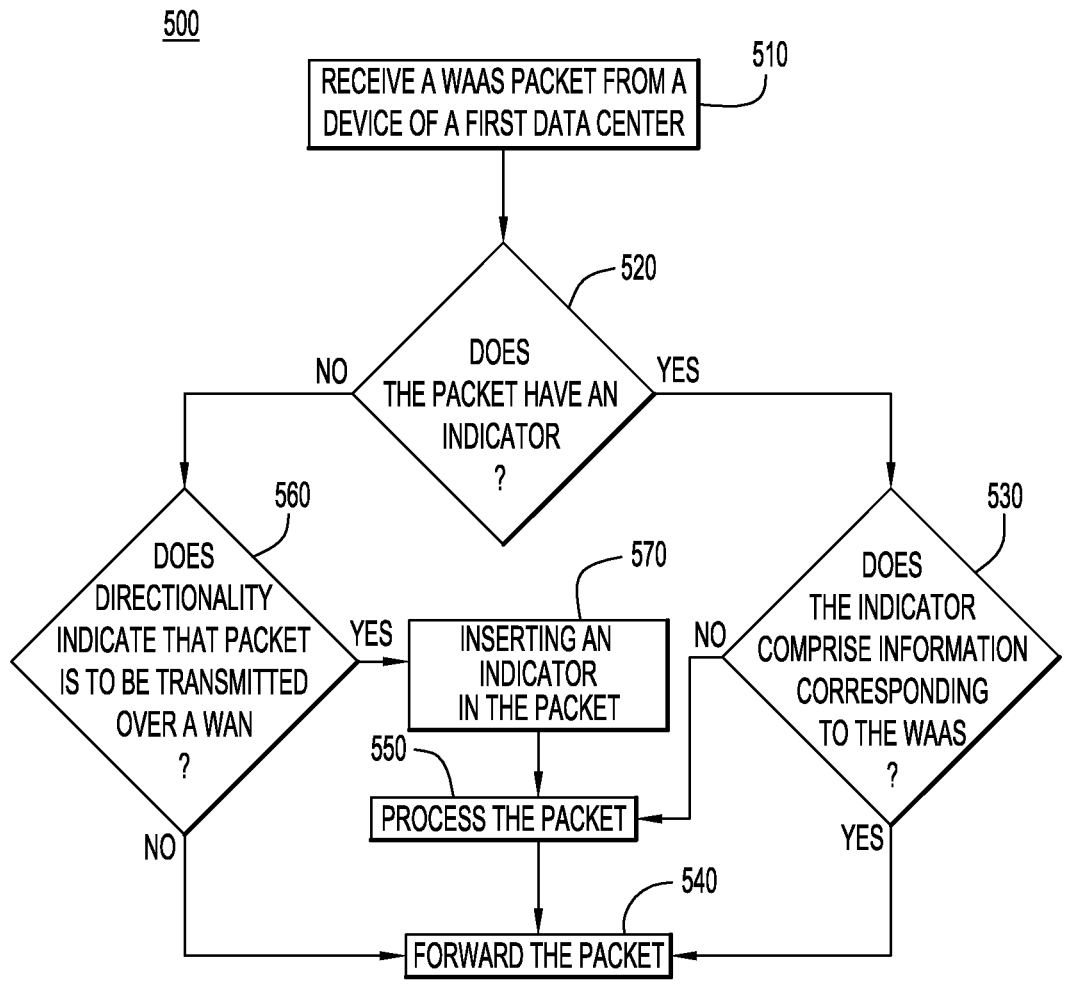
FIG. 4 is a flow chart depicting example operations of the packet loop detection and indicator assertion logic executed in the WAAS device in an auto-detection phase to detect packet loops and associate the packets with the WAAS device.

Turning to FIG. 4, a flow chart depicting operations of the packet loop detection and indicator assertion logic 500 in an auto-detection phase is now described. The auto-detection phase of the packet loop detection and indicator assertion logic 500 occurs for initial packets prior to data flow. For example, syn, ack, syn-ack packets (e.g., for a TCP three way handshake) may be transmitted within the data center 162 during the auto-detection phase. The operations of packet loop detection and indicator assertion logic 500 are performed at 400 and 440 in FIGS. 3A and 3B by the WAAS device 110.

At 510, the WAAS device 110 receives a packet form a device of a first data center (e.g., data center 162 in FIG. 1). The WAAS device 110 determines, at 520, whether the received packet has an indicator. If the received packet has an indicator, the WAAS device 110 determines at 530, whether the indicator comprises information corresponding to or identifying the WAAS device 110. If the received packet has information corresponding to the WAAS device 110, the WAAS device 110 forwards the packet, at 540, to an appropriate network device within the data center 162 (e.g., to the service controller device 120(*a*), as described in FIGS. 3A and 3B, above). If the received packet does not have information corresponding to the WAAS device 110, the WAAS device 110 processes the packet at 550, and forwards the packet, as described at 540, above. For example, at 550, the WAAS device 110 may perform WAN optimization policies on the packet as a part of the processes.

If the packet does not have an indicator (i.e., if the answer to operation 520 is "no"), the WAAS device 110 determines, at 560, whether the directionality of the packet indicates that the packet is to be transmitted over the WAN 172. If the directionality of the packet indicates that the packet is to be transmitted over the WAN 172, the WAAS device 110 inserts an indicator in the packet, at 570, and processes and forwards the packet, as described above by operations 550 and 540.

When the WAAS device 110 inserts the indicator in the packet, the WAAS device 110 may insert an indicator comprising information that associates the packet with the WAAS device 110. If the directionality of the packet does not indicate that the packet is to be transmitted over the WAN 170, the WAAS device 110 forwards the packet to the appropriate network device in the data center 162, as described by operation 540.

Figure 5A:
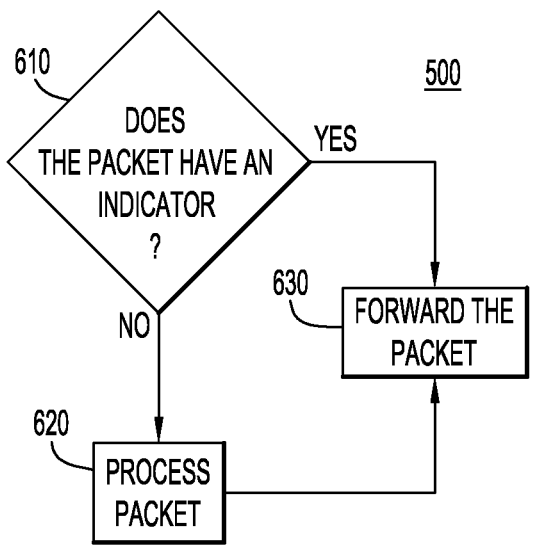
FIGS. 5A and 5B are flow charts depicting example operations of the packet loop detection and indicator assertion logic executed in the WAAS device after the auto-detection phase.
Figure 5B:
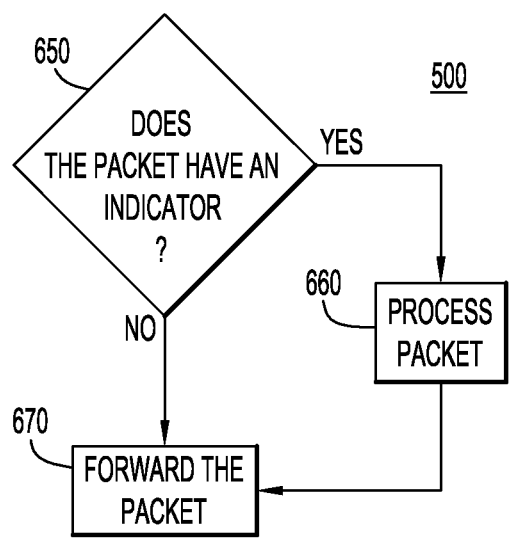

Reference is now made to FIGS. 5A and 5B. FIGS. 5A and 5B show flow charts for operations of the packet loop detection and indicator assertion logic 500 executed in the WAAS device 110 after the auto-detection phase. For example, the operations of the packet loop detection and indicator assertion logic 500 depicted in FIGS. 5A and 5B involve the flow of data packets transmitted within the data center 162 after the initial packets are transmitted in the auto-detection phase. FIG. 5A depicts an example when the WAAS device 110 of the data center 162 receives a data packet with a directionality indicating that it is to be transmitted to one of the client devices 160(*a*) or 160(*b*). For example, the data packet received by the WAAS device 110 may originate from a component within the branch center 170. FIG. 5A may also apply to an example when the edge WAAS device 174 receives a packet destined for a server device in the branch center 170. For simplicity, FIG. 5A is described from the perspective of the WAAS device 110.

At 610, the WAAS device 110 determines whether or not the received packet has an indicator associating it with a WAAS device (e.g., associated with WAAS device 110 or edge WAAS device 174). If the packet does not have an indicator, at 620, the packet is processed, and at 630, the packet is forwarded to an appropriate device for data transmission. If the packet has an indicator, the packet is determined to be a looped packet, and accordingly, the packet is not processed and is forwarded to the appropriate device at 630. In other words, if the WAAS device 110 receives a packet whose directionality indicates that the packet is to be sent to one of the client devices 160(*a*)/160(*b*) in the data center 162, the presence of an indicator will indicate to the WAAS device 110 that the packet is a real looped packet, and the WAAS device 110 will forward the packet accordingly.

FIG. 5B depicts an example when the WAAS device 110 of the data center 162 receives a data packet with a directionality indicating that it is to be transmitted to a server device (for example, residing in the branch center 170). For example, the data packet received by the WAAS device 110 may originate from one of the client devices 160(*a*) and 160(*b*). FIG. 5B may also apply to an example when the edge WAAS device 174 receives a packet destined for one of the client devices 160(*a*)/160(*b*) in the data center 162. For simplicity, FIG. 5B is described from the perspective of the WAAS device 110.

At 650, the WAAS device 110 determines whether or not the received packet has an indicator associating it with a WAAS device. If the packet has an indicator, at 660, the packet is processed, and at 670, the packet is forwarded to an appropriate device for data transmission. If the packet does not have an option tag, the packet is determined to be a looped packet, and accordingly, the packet is not processed and is forwarded to the appropriate device at 660. In other words, if the WAAS device 110 receives a packet whose directionality indicates that the packet is to be sent to a server device, the absence of an indicator will indicate to the WAAS device 110 that the packet is a real looped packet, and the WAAS device 110 will forward the packet accordingly.

It should be appreciated that the techniques described above in connection with all embodiments may be performed by one or more computer readable storage media that is encoded with software comprising computer executable instructions to perform the methods and steps described herein.

In sum, a method is provided comprising: at a wide-area application services device in a first data center, receiving a packet from a device of the first data center; determining a directionality of the packet relative to a destination device of the packet; determining whether the packet has an indicator that associates the packet with the wide-area application services device; based on whether the packet has an indicator that associates the packet with the wide area application services device, inserting an indicator in the packet when the directionality of the packet indicates that the packet is to be transmitted across a wide area network (WAN), wherein the indicator inserted in the packet comprises information that associates the packet with the wide-area application services device; and forwarding the packet to a network based on its directionality.

Additionally, these techniques may be embodied in one or more computer readable storage media encoded with software comprising computer executable instructions and when the software is executed operable to: receive a packet from a device of a first data center; determine a directionality of the packet relative to a destination device of the packet; determine whether the packet has an indicator that associates the packet with a wide-area application services device; based on whether the packet has an indicator that associates the packet with the wide area application services device, insert an indicator in the packet when the directionality of the packet indicates that the packet is to be transmitted across a wide area network, wherein the indicator inserted in the packet comprises information that associates the packet with the wide-area application services device; and forward the packet to a network based on its directionality.

Furthermore, an apparatus is provided comprising: a network interface device; a memory; and a processor configured to: receive a packet from a device of a first data center; determine a directionality of the packet relative to a destination device of the packet; determine whether the packet has an indicator that associates the packet with the apparatus; based on whether the packet has an indicator that associates the packet with the wide area application services device insert an indicator in the packet when the directionality of the packet indicates that the packet is to be transmitted across a wide area network, wherein the indicator inserted in the packet comprises information that associates the packet with the apparatus; and forward the packet to a network based on its directionality.

The above description is intended by way of example only. Various modifications and structural changes may be made therein without departing from the scope of the concepts described herein and within the scope and range of equivalents of the claims.

What is claimed is:

1. A method comprising:
    at a wide-area application services (WAAS) device in a first data center, receiving a packet from a device of the first data center;
    determining a directionality of the packet relative to a destination device of the packet;
    determining whether the packet has an indicator that associates the packet with a WAAS device;
    if the directionality of the packet indicates that the packet is to be transmitted across a wide area network to a second data center in which the destination device resides and it is determined that the packet does not have an indicator that associates the packet with a WAAS device:
        inserting an indicator in the packet that associates the packet with the WAAS device in the first data center; and
        forwarding the packet for transmission over the wide area network; and
    if the directionality of the packet indicates that the packet is to be transmitted across the wide area network to the second data center and it is determined that the packet has an indicator that does not associate the packet with the WAAS device in the first data center, determining that the packet is a looped packet that was transmitted to the WAAS device as a result of an error.

2. The method of claim 1, wherein receiving comprises receiving the packet to be transmitted across a local area network to a destination device in the first data center.

3. The method of claim 2, further comprising determining that the packet is a looped packet within the first data center that was transmitted to the WAAS as a result of an error when the packet does not have an indicator and the directionality of the packet indicates that the packet was received from the second data center over the wide area network and is destined for the destination device across the local area network.

4. The method of claim 1, wherein inserting the indicator in the packet comprises inserting a Transport Control Protocol option tag.

5. The method of claim 1, further comprising determining that the packet is looped within the first data center by analyzing a sequence number in the packet.

6. One or more non-transitory computer readable storage media encoded with software comprising computer executable instructions and when the software is executed operable to:
    receive a packet from a device of a first data center;
    determine a directionality of the packet relative to a destination device of the packet;
    determine whether the packet has an indicator that associates the packet with a wide-area application services (WAAS) device;
    if the directionality of the packet indicates that the packet is to be transmitted across a wide area network to a second data center in which the destination device resides and it is determined that the packet does not have an indicator that associates the packet with a WAAS device:
        insert an indicator in the packet that associates the packet with the WAAS device in the first data center; and
        forward the packet for transmission over the wide area network; and
    if the directionality of the packet indicates that the packet is to be transmitted across the wide area network to the second data center and it is determined that the packet has an indicator that does not associate the packet with the WAAS device in the first data center, determine that the packet is a looped packet that was transmitted to the WAAS device as a result of an error.

7. The computer readable storage media of claim 6, wherein the instructions that cause the processor to receive the packet comprise instructions that cause the processor to receive the packet to be transmitted across a local area network to a destination device in the first data center.

8. The computer readable storage media of claim 7, further comprising instructions that cause the processor to determine that the packet is a looped packet within the first data center that was transmitted to the WAAS as a result of an error when the packet does not have an indicator and the directionality of the packet indicates that the packet was received from the second data center over the wide area network and is destined for the destination device across the local area network.

9. The computer readable storage media of claim 6, wherein the instructions that cause the processor to insert the indicator in the packet comprises instructions that cause the processor to insert a transport control protocol option tag.

10. The computer readable storage media of claim 6, further comprising instructions that cause the processor to determine that the packet is looped within the first data center by analyzing a sequence number of the packet.

11. An apparatus comprising:
a network interface device;
a memory; and
a processor configured to:
receive a packet from a device of a first data center;
determine a directionality of the packet relative to a destination device of the packet;
determine whether the packet has an indicator that associates the packet with the apparatus;
if the directionality of the packet indicates that the packet is to be transmitted across a wide area network to a second data center in which the destination device resides and it is determined that the packet does not have an indicator that associates the packet with the apparatus:
insert an indicator in the packet that associates the packet with the apparatus; and
forward the packet for transmission over the wide area network; and
if the directionality of the packet indicates that the packet is to be transmitted across the wide area network to the second data center and it is determined that the packet has an indicator that does not associate the packet with the apparatus, determine that the packet is a looped packet that was transmitted to the apparatus as a result of an error.

12. The apparatus of claim 11, wherein the processor is further configured to receive the packet to be transmitted across a local area network to a destination device in the first data center.

13. The apparatus of claim 12, wherein the processor is further configured to determine that the packet is a looped packet within the first data center that was transmitted to the apparatus as a result of an error when the packet does not have an indicator and the directionality of the packet indicates that the packet was received from the second data center over the wide area network and is destined for the destination device across the local area network.

14. The apparatus of claim 11, wherein the processor is further configured to insert the indicator in the packet comprises instructions that cause the processor to insert a transport control protocol option tag.

* * * * *